(12) United States Patent
Davydychev et al.

(10) Patent No.: US 7,457,707 B2
(45) Date of Patent: Nov. 25, 2008

(54) METHOD FOR DETERMINING AN EFFECTIVE FORMATION CONDUCTIVITY FOR INDUCTION LOG BOREHOLE CORRECTION

(75) Inventors: Andrei I. Davydychev, Sugar Land, TX (US); Gerald N. Minerbo, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 61 days.

(21) Appl. No.: 11/606,631

(22) Filed: Nov. 30, 2006

(65) Prior Publication Data

US 2008/0133138 A1 Jun. 5, 2008

(51) Int. Cl.
*G06F 19/00* (2006.01)
(52) U.S. Cl. .......................... 702/7; 324/339
(58) Field of Classification Search .................. 702/14, 702/16, 182–185, 188; 324/339
See application file for complete search history.

(56) References Cited

U.S. PATENT DOCUMENTS

| 5,041,975 | A | 8/1991 | Minerbo et al. |
| 5,900,733 | A | 5/1999 | Wu et al. |
| 6,216,089 | B1 | 4/2001 | Minerbo |
| 7,027,923 | B2 | 4/2006 | Barber et al. |
| 7,042,225 | B2 | 5/2006 | Barber |
| 7,076,370 | B1 | 7/2006 | Freedman et al. |
| 2007/0205770 | A1* | 9/2007 | Fanini et al. ............ 324/339 |

* cited by examiner

*Primary Examiner*—Edward Raymond
(74) *Attorney, Agent, or Firm*—Darla Fonseca; Jaime Castano

(57) ABSTRACT

A method for correcting induction conductivity well log measurements for conductivity of a wellbore and a formation proximate the wellbore includes estimating an effective formation conductivity for the formation proximate the wellbore from measurements made by an induction receiver proximate an induction transmitter. The effective formation conductivity is used to correct apparent conductivity measurements made by at least one induction receiver on the instrument.

12 Claims, 10 Drawing Sheets

METHOD FOR DETERMINING AN EFFECTIVE FORMATION CONDUCTIVITY FOR INDUCTION LOG BOREHOLE CORRECTION

BACKGROUND OF THE INVENTION

1. Field of the Invention

The invention relates generally to the field of electromagnetic induction logging of Earth formations penetrated by a wellbore. More specifically, the invention is related to methods for adjusting measurements made by an electromagnetic induction well logging instrument for the effects of fluids (or air) in the wellbore and the conductivity of formations proximate the wall of the wellbore. An iterative method is described to correct the induction measurements for the effect of the wellbore, taking into account the conductivity of the formation immediately surrounding the wellbore.

2. Background Art

Electromagnetic induction well logging instruments are used to determine electrical conductivity of Earth formations penetrated by a wellbore. The electrical conductivity of formations is used, for example, to infer the presence of hydrocarbons in certain formations. A typical induction well logging instrument includes a generally elongated cylindrical sonde configured to move along the interior of the wellbore. The instrument sonde includes one or more transmitters, usually in the form of wire coils, and a plurality of receivers, also usually in the form of wire coils, the receivers being spaced at different selected longitudinal distances from the transmitter(s) along the mandrel. Circuitry in the instrument is used to generate electric current to energize the transmitter(s) and to detect various attributes of signals detected by the receivers. Electric current is passed through the transmitter(s) to induce electromagnetic fields in the formations surrounding the wellbore. Voltages are induced in the receiver as a result of the currents induced in the formation. Certain components of the induced voltages are related to the conductivity of the media surrounding the instrument.

In order to determine formation conductivities more accurately, it is useful to be able to determine the effect of any materials (mud or air) in the wellbore itself on the measurements made by the various receivers in the instrument. Taking such effects into account and adjusting the measurements made by the instrument is referred to as "borehole correction."

When performing borehole correction for the conductivities measured by earlier, analog version induction instruments, such as one marketed under the trademark DIT by affiliates of the assignee of the present invention, the spatial distribution of the induction response, called "pseudo-geometrical factor" was considered to be independent of the conductivities of the various surrounding media, and the borehole-corrected conductivities were obtained from resulting linear equations, separately, for each of the medium induction response (ILM) and the deep induction response (ILD). For details, see *Schlumberger Log Interpretation Principles/Applications* Schlumberger Educational Services (1989).

The borehole correction procedure for another series of instruments, marketed under the trademark AIT by affiliates of the assignee of the present invention, is based on a true inversion with respect to some of the relevant parameters. Such an inversion is possible when measurements from several "short induction arrays" (arrays being induction receivers including a main receiver coil and a series connected, inverse polarity "bucking" coil both spaced closely to the induction transmitter) are available. For example, assuming that the wellbore diameter and the wellbore fluid ("mud") conductivity are known from other measurements (e.g. a caliper and a mud resistivity sensor), it was possible to perform inversion with respect to formation conductivity and the tool standoff. For a more detailed description of such borehole correction procedures, see, e.g., U.S. Pat. No. 5,041,975, issued to Minerbo et al. and assigned to the assignee of the present invention.

The principles of a borehole correction procedure for a three-dimensional induction instrument, marketed by affiliates of the assignee of the present invention under the trademark RTSCANNER, are similar conceptually to the above procedures described in the '975 patent, but the three-dimensional procedure itself is much more complicated because nine components of a three-dimensional conductivity tensor are involved. For details of the foregoing procedure, see U.S. patent application Publication No. 2005/0256642, the underlying application of which is also assigned to the assignee of the present invention.

SUMMARY OF THE INVENTION

One aspect of the invention is a method for correcting induction conductivity well log measurements for the effect of a wellbore whose conductivity differs from the conductivity of a formation proximate the wellbore. A method according to this aspect of the invention includes estimating an effective formation conductivity for the formation proximate the wellbore from measurements made by an induction receiver proximate an induction transmitter. The effective formation conductivity is used to correct apparent conductivity measurements made by a proximate receiver, and in some embodiments correct those made by other induction receivers more distant from the transmitter than the proximate receiver.

Another aspect of the invention is a method for determining conductivity of formations penetrated by a wellbore. A method according to this aspect of the invention includes moving an induction well logging instrument along the wellbore. The instrument includes at least one transmitter and a plurality of receivers at spaced apart positions along the instrument from the transmitter. Electric current is passed through the transmitter to induce electromagnetic fields in the formations. Voltages are detected in each of the plurality of receivers. The voltages correspond to electrical conductivity of the media surrounding the well logging instrument. An effective formation conductivity is estimated for the formation proximate the wellbore from measurements made by a receiver proximate the transmitter. The effective formation conductivity is used to correct apparent conductivity measurements made by the proximate receiver, and in some embodiments by other induction receivers more distant from the transmitter than the proximate receiver.

Other aspects and advantages of the invention will be apparent from the following description and the appended claims.

DETAILED DESCRIPTION

Figure 1:
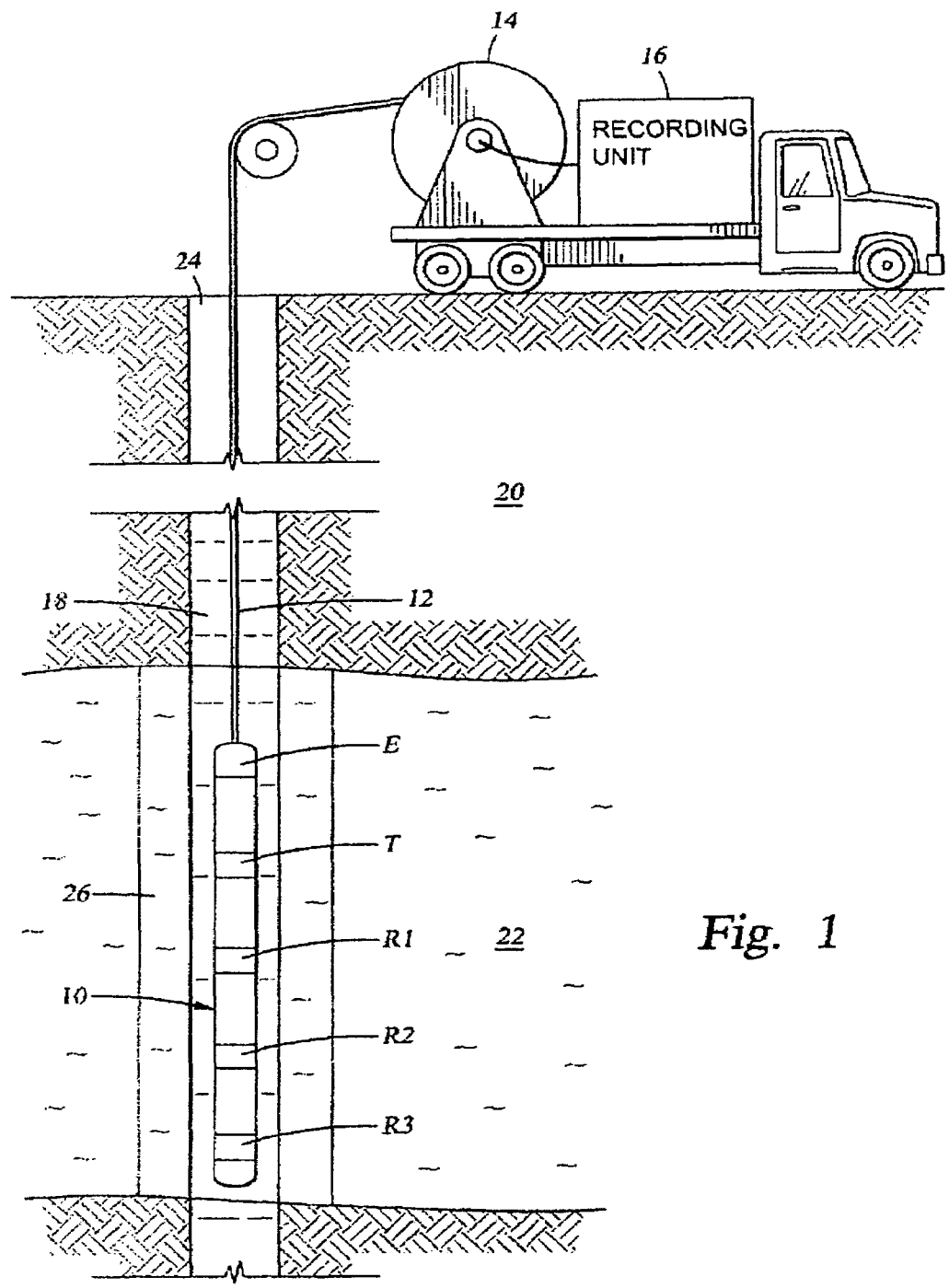
FIG. 1 shows a typical induction well logging instrument disposed in a wellbore drilled through Earth formations.

FIG. 1 schematically shows an induction well logging instrument as it is typically used in a wellbore drilled through subsurface Earth formations. The illustration in FIG. 1 is intended to show conceptually a possible source of measurements used in a method according to the invention, and is not intended to limit the type of induction well logging instrument that may be used with the invention. The illustration in FIG. 1 is also not intended to present any limit on the manner in which an induction well logging instrument may be conveyed into a wellbore.

A wellbore 18 is drilled through subsurface Earth formations, shown generally at 20 and 22. The wellbore 18 is typically filled with fluid 24 commonly referred to as "drilling mud" during the drilling of the wellbore 18 and during "well logging" operations, in which one or more well logging instruments 10 are inserted into the wellbore 18 and withdrawn. In the present embodiment, the well logging instrument 10 is an induction logging instrument. The instrument 10 is disposed in a generally cylindrically shaped sonde or similar housing configured to allow the instrument 10 to move longitudinally along the wellbore 18. The instrument 10 includes an induction transmitter T, which may be in the form of a wire coil wound so that its turns lie in planes substantially perpendicular to the longitudinal axis of the instrument 10. The present embodiment of the instrument includes three induction receivers R1, R2, R3 disposed along the instrument at longitudinally spaced apart positions from the transmitter T. The receivers R1, R2, R3 may also be in the form of substantially longitudinally wound wire coils. Typically, induction receivers will include a main receiver coil and a series connected, inverse polarity "bucking" coil (not shown for clarity). The bucking coil serves to cancel the effects of direct electromagnetic coupling between the transmitter T and the receivers R1, R2, R3. Electronic circuits, shown generally at E, may include (none of the following show separately) transmitter circuitry to drive the transmitter T, receiver circuitry to detect voltages induced in the receivers R1, R2, R3 by electromagnetic induction effects, and circuitry to communicate the measurements made by the receivers R1, R2, R3 to a recording unit 16 at the surface.

The measurements made by each of the receivers R1, R2, R3 will be related to the conductivity of all the media surrounding the instrument 10. However, as a general principle, the greater the longitudinal spacing between the transmitter T and any one of the receivers R1, R2, R3, the greater will be the signal contribution from the formations more laterally distant from the wellbore 18. An objective of using instruments such as shown in FIG. 1 that include a plurality of longitudinally spaced apart receivers is to be able to study the conductivity distribution of the media surrounding the instrument at different radial depths of investigation. Such media, of course, include the wellbore and the formations.

In the present embodiment, the instrument 10 is extended into and withdrawn from the wellbore 18 by an armored electrical cable 12. The cable includes one or more insulated electrical conductors surrounded by helically wound steel wires. The cable 12 is extended and retracted by a winch 14 or similar device known in the art.

As explained above, the manner of conveyance of the instrument 10 is merely illustrative. Other well known conveyance methods, including drill pipe, coiled tubing, production tubing, and in a drill string such as "logging while drilling" may be used in different implementations without exceeding the scope of this invention.

The Earth formations 20, 22 may include impermeable formations, generally shown at 20, and may include permeable formations such as 22. Permeable formations may include a zone proximate the wellbore 18 in which the liquid phase of the drilling mud 24 displaces some of the native fluid present in the pore spaces of the formation 22. Such zone may be referred to as an "invaded zone" 26, and its electrical properties may be changed by such fluid movement, depending on the electrical conductivity of the displaced fluid and the electrical conductivity of the liquid phase of the drilling mud 24.

A method according to the invention includes determining an effective formation conductivity ("EFC") to be used in an induction borehole correction procedure. The borehole correction procedure consists of subtracting the borehole-related contribution from the apparent conductivity measured by the induction receivers R1, R2, R3. Effectively, the foregoing is equivalent to "replacing" the borehole 18 by a medium of the same conductivity as the formation 20 or 26 proximate the outside of the borehole 18.

The borehole-related contribution to the apparent conductivity measured at the receivers, represented by $\Delta$, depends on the borehole radius $r_b$, the wellbore fluid ("mud") conductivity $\sigma_m$, the instrument position within the wellbore (called "decentralization" d), and the EFC ($\sigma_t$). One can also introduce a pseudo-geometrical factor g, in order to define the borehole contribution as $\Delta=(\sigma_m-\sigma_t)g$. If the instrument has several induction receivers, such as those shown at R1, R2, R3 in FIG. 1, the borehole-related contribution will be different for each array because of the different lateral (radial) response characteristics of each receiver array, but such borehole contribution to the response of each array will depend on the same parameters, in particular, the same EFC.

In a method according to the invention, the effective formation conductivity is determined by using the apparent conductivity measured by the most closely spaced receiver R1 because its response is indicative of the formation conductivity proximal to the wellbore. The pseudo-geometrical factor that can be tabulated by using forward modeling of the instrument response. Moreover, it has been determined that in many situations reliable measurements may be obtained only from the real part of the apparent conductivity. The real part of the receiver voltage is also called the "in-phase component", or the "R signal." Using the measurement of the real part of the apparent conductivity, the resulting equation for the EFC can be solved iteratively. If the measurement of the imaginary part (the "X signal") is also reliable, similar procedure can also be used for a linear combination of the R and X signals.

In modeling response of the instrument 10 in FIG. 1, the spacings between the transmitter T and the receivers R1, R2, and R3 were taken as corresponding to "shallow", "medium", and "deep" measurements, respectively. What should be clearly understood, however, is that the particular transmitter to receiver spacings in the present description are intended only to illustrate the principle of the invention and to describe modeled results with respect to selected examples of mud conductivity, wellbore diameter and instrument displacement from the center of the wellbore. Other transmitter to receiver spacings, instrument configurations, numbers of transmitters and receivers and which receiver signals are used to estimate the EFC are also within the scope of this invention. Further, in the present example, the signals from the receiver most closely spaced to the transmitter is the one used to estimate the EFC. It is also within the scope of this invention to use a receiver that is not the closest spaced to the transmitter to estimate the EFC, or a combination of two or more receivers. In the description which follows, and for purposes of defining the scope of the invention, the receiver used to estimate the EFC is referred to as "proximate" the transmitter. Proximate may be defined for purposes of the invention as being at a sufficiently close distance to the transmitter such that its response is indicative of the formation conductivity in the zone immediately surrounding the wellbore, to allow determination of the EFC.

Figure 2:
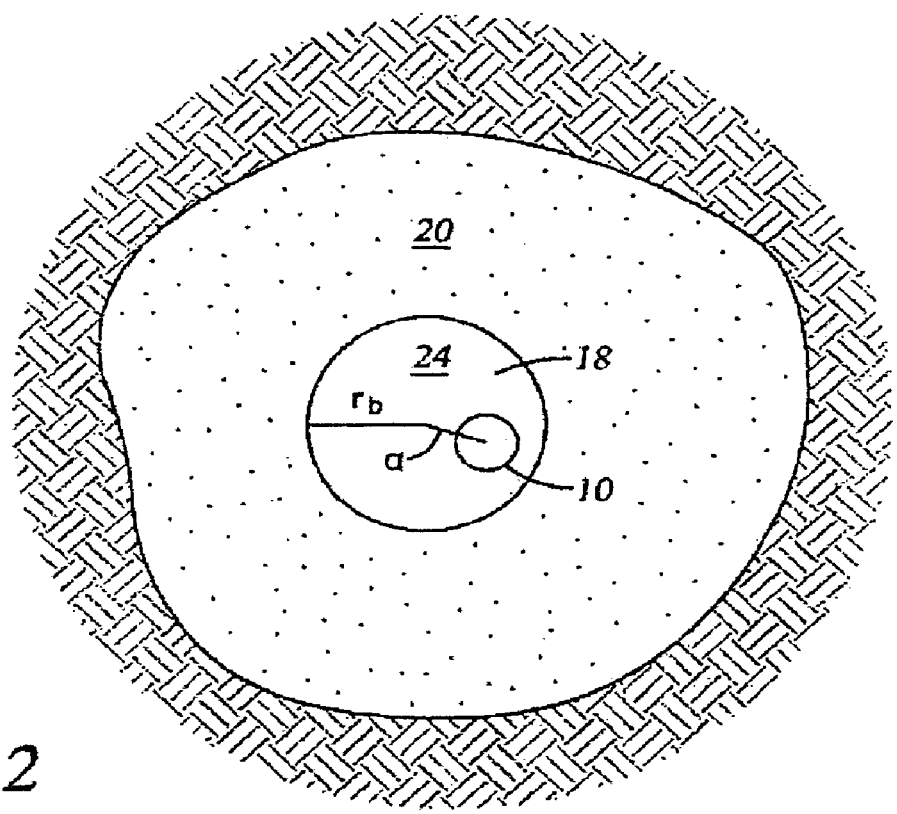
FIG. 2 shows a cross section of an instrument such as shown in FIG. 1 wherein the wellbore includes fluid having a certain conductivity and formations outside the wellbore having a conductivity.

To explain the effective formation conductivity ("EFC"), referring to FIG. 2, the instrument 10 is shown disposed in the wellbore 18 in an electrically homogeneous formation 20 having a conductivity represented by $\sigma_t$. The wellbore 18 is filled with mud 24 having conductivity represented by $\sigma_m$.

For any given induction receiver response, the borehole effect can be represented by the expression:

$$\sigma_a(\sigma_m,\sigma_t)=\sigma_a^{(hom)}(\sigma_t)+\Delta(r_b,d,\sigma_m,\sigma_t),$$

where $$\sigma_a(\sigma_m,\sigma_t)=\sigma_R+i\sigma_X$$

is the apparent conductivity measured at each receiver (consisting of its real component $\sigma_R$ and its imaginary component $\sigma_X$ and indicated as being a function of the effective formation conductivity and the mud conductivity). $\sigma_a^{(hom)}(\sigma_t)$ is the apparent conductivity that would be measured in a homogeneous medium of conductivity $\sigma_t$, $\Delta(r_b,d,\sigma_m,\sigma_t)$ is the borehole effect contribution, $r_b$ is the wellbore radius and d is the distance by which the instrument 10 is displaced from the center of the wellbore 18. Such displacement distance is related to the instrument standoff s (representing the distance from tool body to borehole wall). As is known in the art, induction logging instruments are typically used with devices called "standoffs" that keep the instrument a substantially fixed distance from the wall of the wellbore. Thus, the displacement may be determined directly from the wellbore radius (such as may determined from external measurements such as from a caliper, or by assuming the radius is the same as that of a drill bit used to drill the wellbore).

Figure 3:
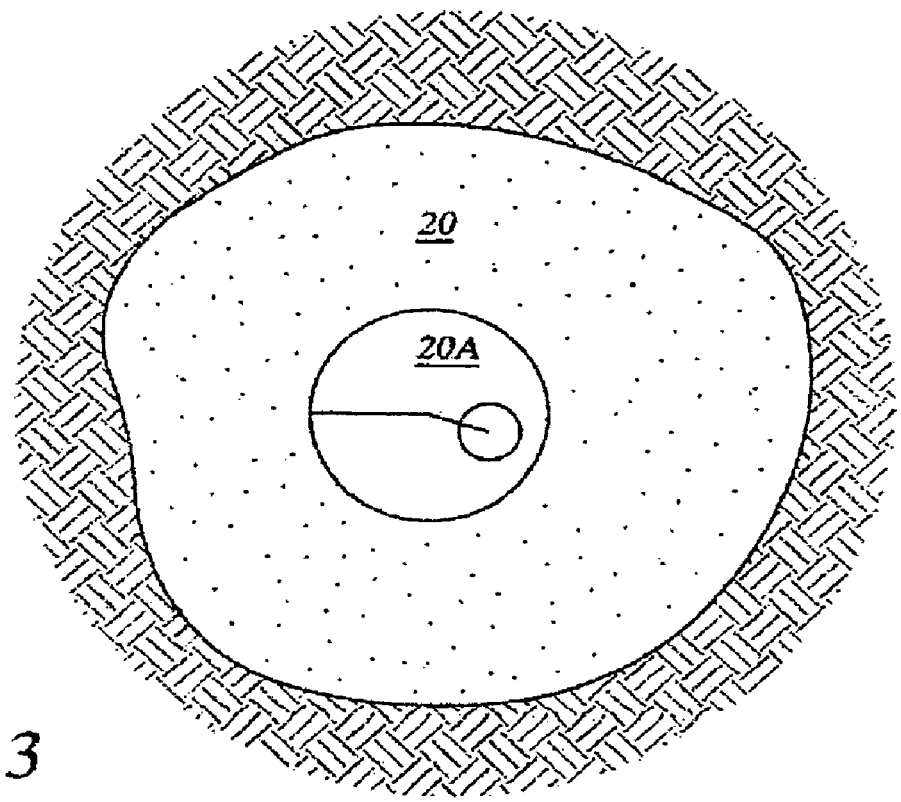
FIG. 3 shows a cross section similar to FIG. 2 in which "borehole correction" for the instrument response results in physical equivalence of disposing the instrument in a homogeneous medium.

In the present case, for the media shown in FIG. 2, the borehole correction procedure would be to subtract the wellbore contribution $\Delta(r_b,d,\sigma_m,\sigma_t)$ from the apparent conductivity $\sigma_a(\sigma_m,\sigma_t)$ and, as a result, to get the homogeneous formation signal $\sigma_a^{(hom)}(\sigma_t)$ that would be obtained if the wellbore were not present, as shown schematically in FIG. 3. In FIG. 3, the wellbore is shown as being filled with medium 20A which has the same conductivity as the surrounding formation 20.

In other words, effectively the wellbore 18, with mud conductivity $\sigma_m$ is "substituted" by the medium 20A of conductivity $\sigma_t$, which is the same as that of the surrounding formation 20. Equation (1) is correct for any receiver on the instrument, noting however that the corresponding borehole correction function $\Delta$ is different for each receiver. It is thus necessary to perform the same type of borehole correction procedure for each array.

Figure 4:
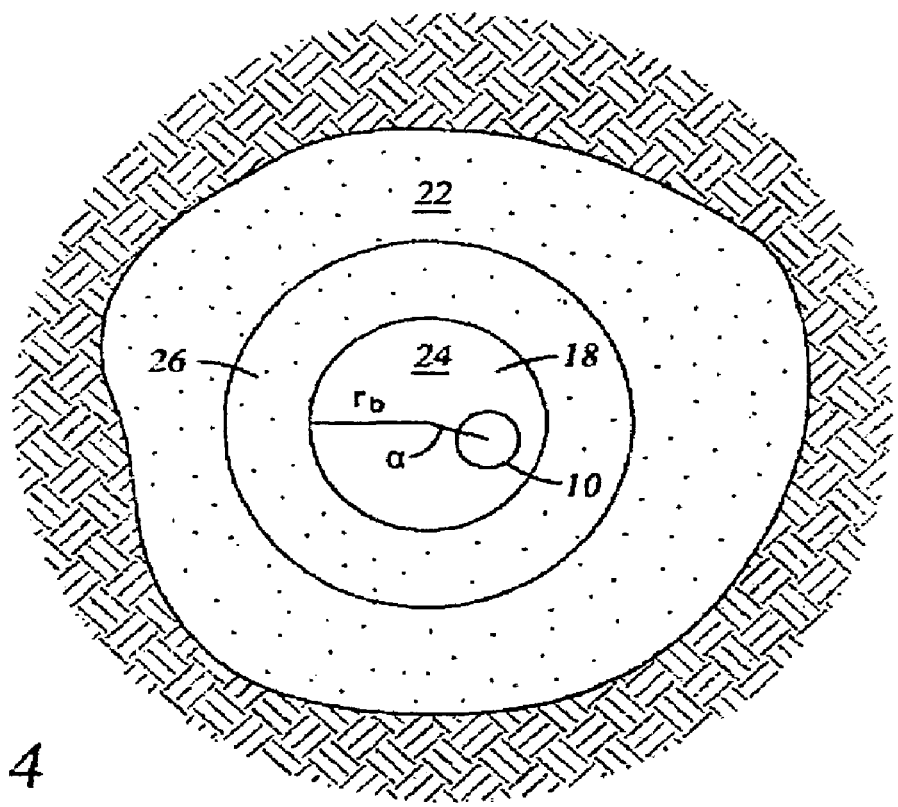
FIGS. 4 and 5 show a similar arrangement as FIGS. 2 and 3, with the addition of a layer of formation proximate the wellbore wall that has altered conductivity, such as by fluid invasion from the wellbore.

In actual wellbore environments, and referring to FIG. 4, the media are usually more electrically complicated than shown in FIG. 2. In particular, permeable media, such as formation 22 may include infiltration of the liquid phase of the drilling mud (called "invasion") and thus introduce a layer, e.g., invaded zone 26 of conductivity different than both that of the wellbore and the unaffected formation (e.g., 22 in FIG. 1).

Figure 5:
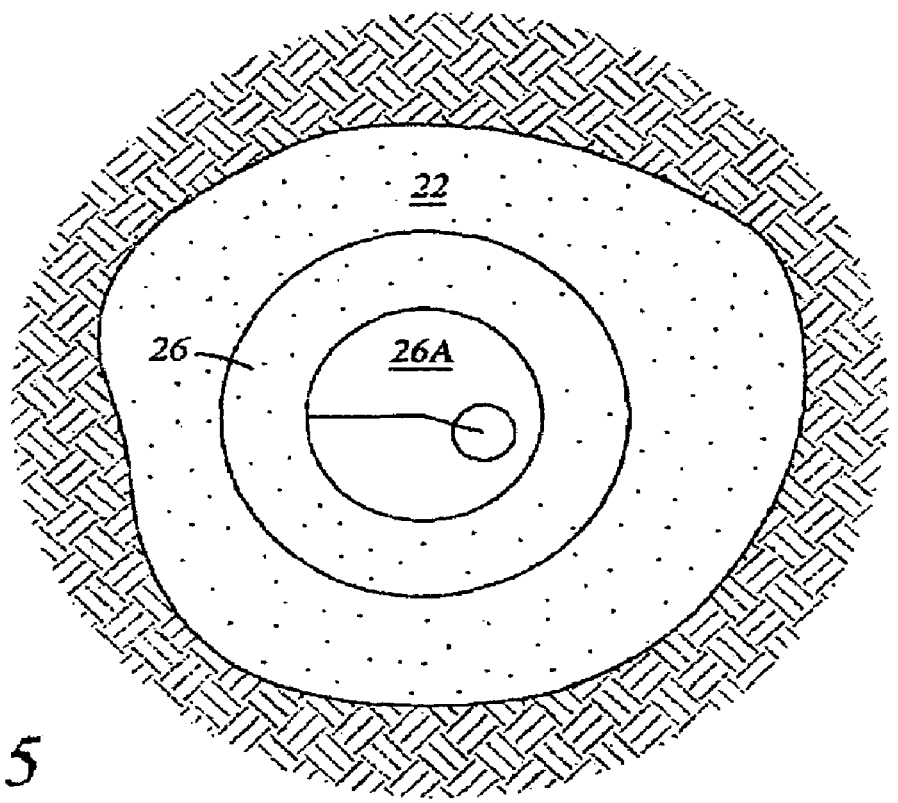

The issue addressed by the method of the invention is what is used as the EFC $\sigma_t$ in such media when performing the borehole correction procedure. In other words, when the borehole contribution $\Delta(r_b,d,\sigma_m,\sigma_t)$ is subtracted from the measured apparent conductivity $\sigma_a$ (for each receiver), what value of the conductivity $\sigma_t$ should be used to calculate the corresponding $\Delta$. The borehole correction is ideally equivalent to replacing the wellbore by a homogeneous medium of the conductivity of the zone proximate the wellbore wall. Such situation is shown in FIG. 5 at 26A. The EFC can be determined by an iterative procedure.

Thus, in a method according to the invention an estimate is generated of an effective formation conductivity just beyond the borehole wall. As a practical matter, in a multiple receiver instrument such as shown in FIG. 1, the response of the receiver closest to the transmitter will give the best indication of the formation conductivity immediately surrounding the wellbore. Therefore, it is preferable to use the nearest receiver R1 measurement to estimate the effective formation conductivity. As explained above, however, a "proximate" receiver response may be used in other embodiments of the invention.

From this point on, the description will be directed to the response for the closest receiver (R1 in FIG. 1). Rearranging Eq. (1), the borehole effect "delta" can be expressed as:

$$\Delta(r_b,d,\sigma_m,\sigma_t)=(\sigma_m-\sigma_t)g(r_b,d,\sigma_m,\sigma_t). \quad (2)$$

It is possible to extract the factor $(\sigma_m-\sigma_t)$ from Eq. (2) because there is no borehole effect in homogeneous medium, i.e., when $\sigma_t=\sigma_m$. In other words, for a properly borehole corrected receiver measurement, $\Delta(r_b,d,\sigma_t,\sigma_t)=0$. Thus it is possible to obtain the expression $$\sigma_a(\sigma_m,\sigma_t)=\sigma_a^{*hom}(\sigma_t)+(\sigma_m-\sigma_t)\,g(r_b,d,\sigma_m,\sigma_t), \quad (3)$$

where g represents a "pseudo-geometrical factor" that may be obtained by modeling instrument response for a number of different values of mud conductivity, formation conductivity, wellbore radius and instrument center displacement. The signal measured at the receiver includes a real (in phase with the transmitter current) component and an imaginary (quadrature) component. Taking the real $\sigma_R$ and imaginary $\sigma_X$ components of Eq. (3) provides the following expressions:

$$\sigma_R(\sigma_m,\sigma_t)=\sigma_R^{(hom)}(\sigma_t)+(\sigma_m-\sigma_t)\,g_R(r_b,d,\sigma_m,\sigma_t), \quad (4)$$

$$\sigma_X(\sigma_m,\sigma_t)=\sigma_X^{(hom)}(\sigma_t)+(\sigma_m-\sigma_t)\,g_X(r_b,d,\sigma_m,\sigma_t), \quad (5)$$

where $$g_R(r_b,d,\sigma_m,\sigma_t)=Re[g(r_b,d,\sigma_m,\sigma_t)], \quad (6)$$

$$g_X(r_b,d,\sigma_m,\sigma_t)=Im[g(r_b,d,\sigma_m,\sigma_t)]. \quad (7)$$

Figure 6:
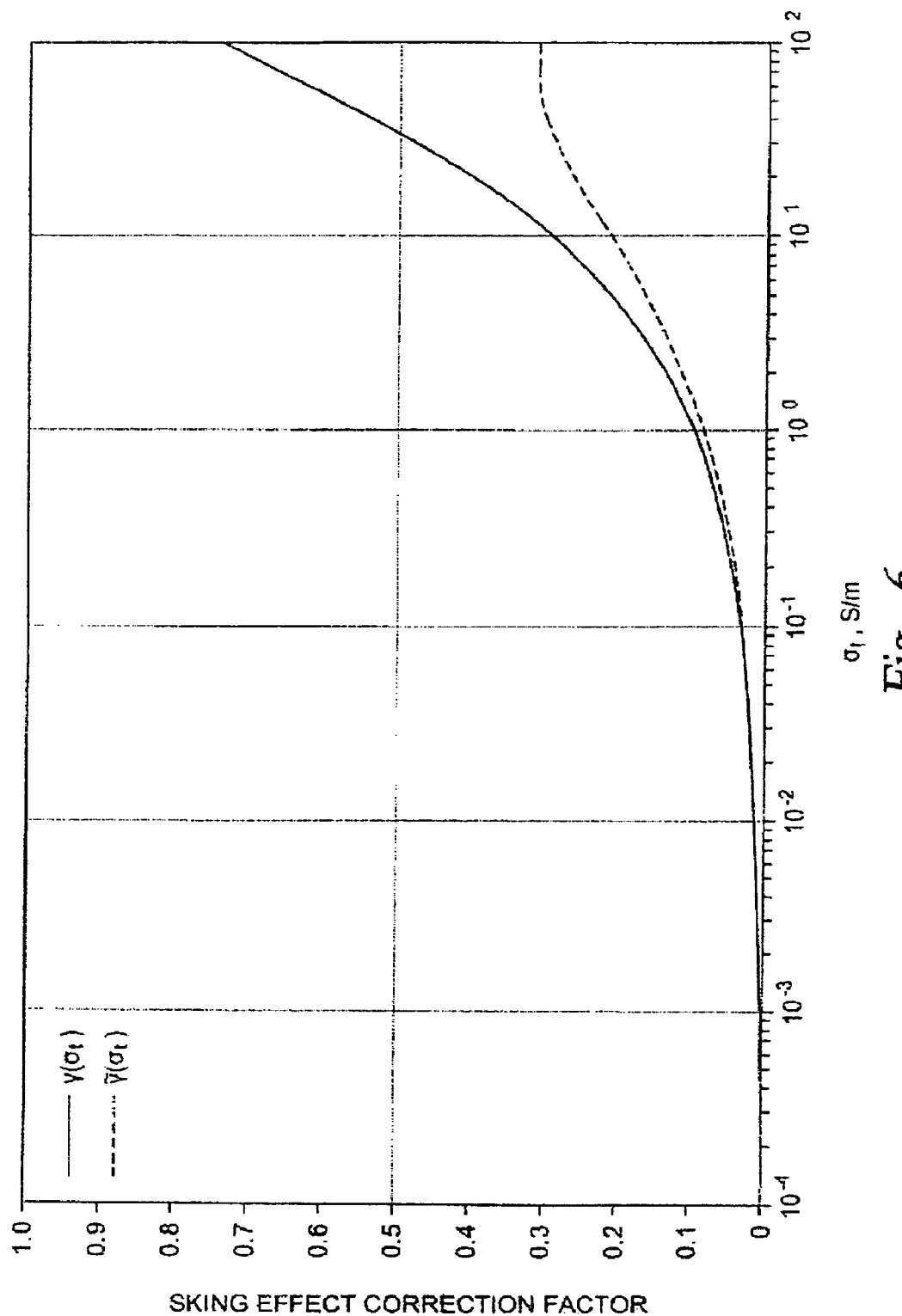
FIG. 6 shows a graph of real (R) signal and imaginary (X) signal component skin effect correction functions as they relate to formation conductivity.
Figure 7A:
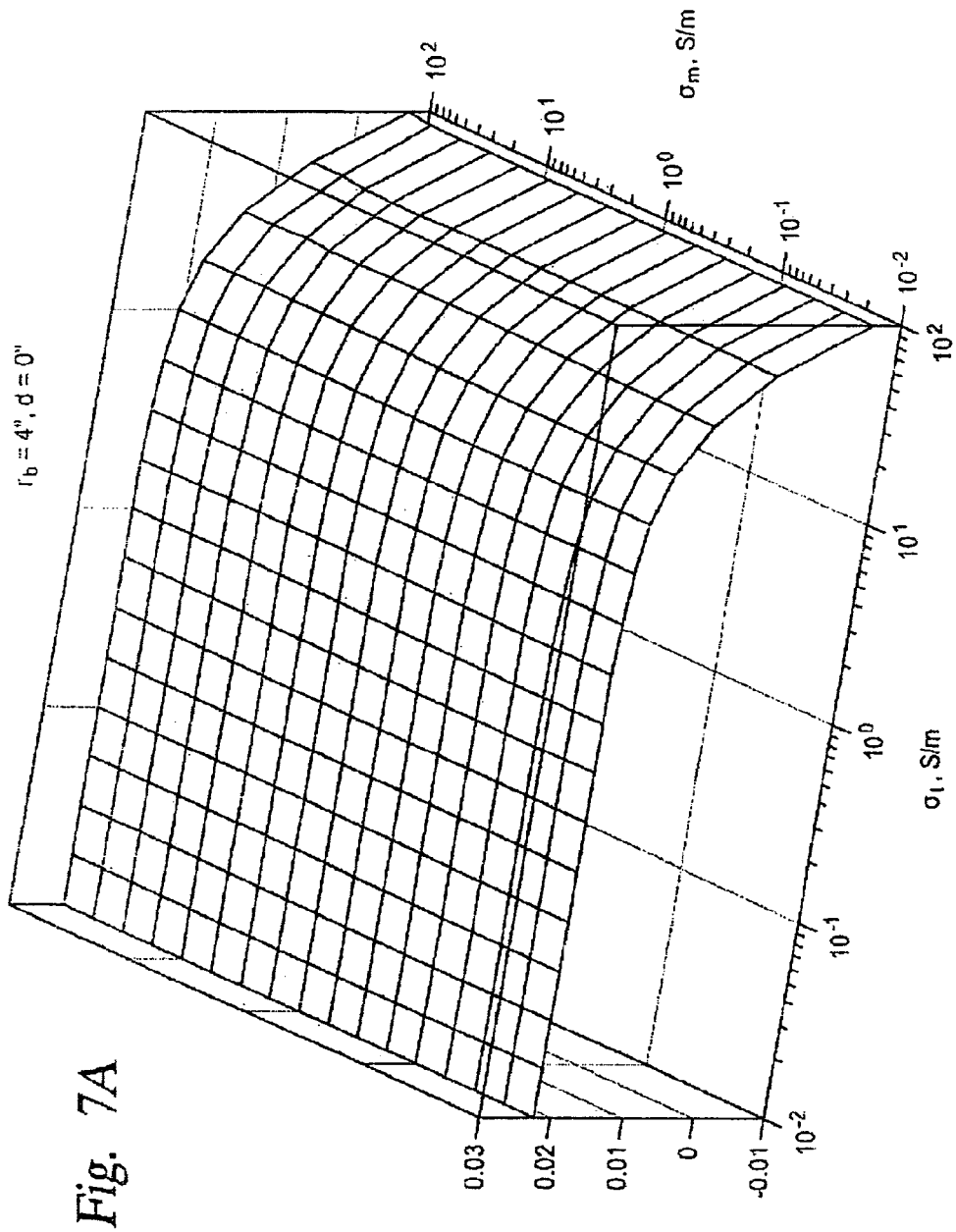
FIGS. 7A through 7F show graphs of calculated values of a pseudo geometric factor for various wellbore diameters and instrument decentralization values.
Figure 7B:
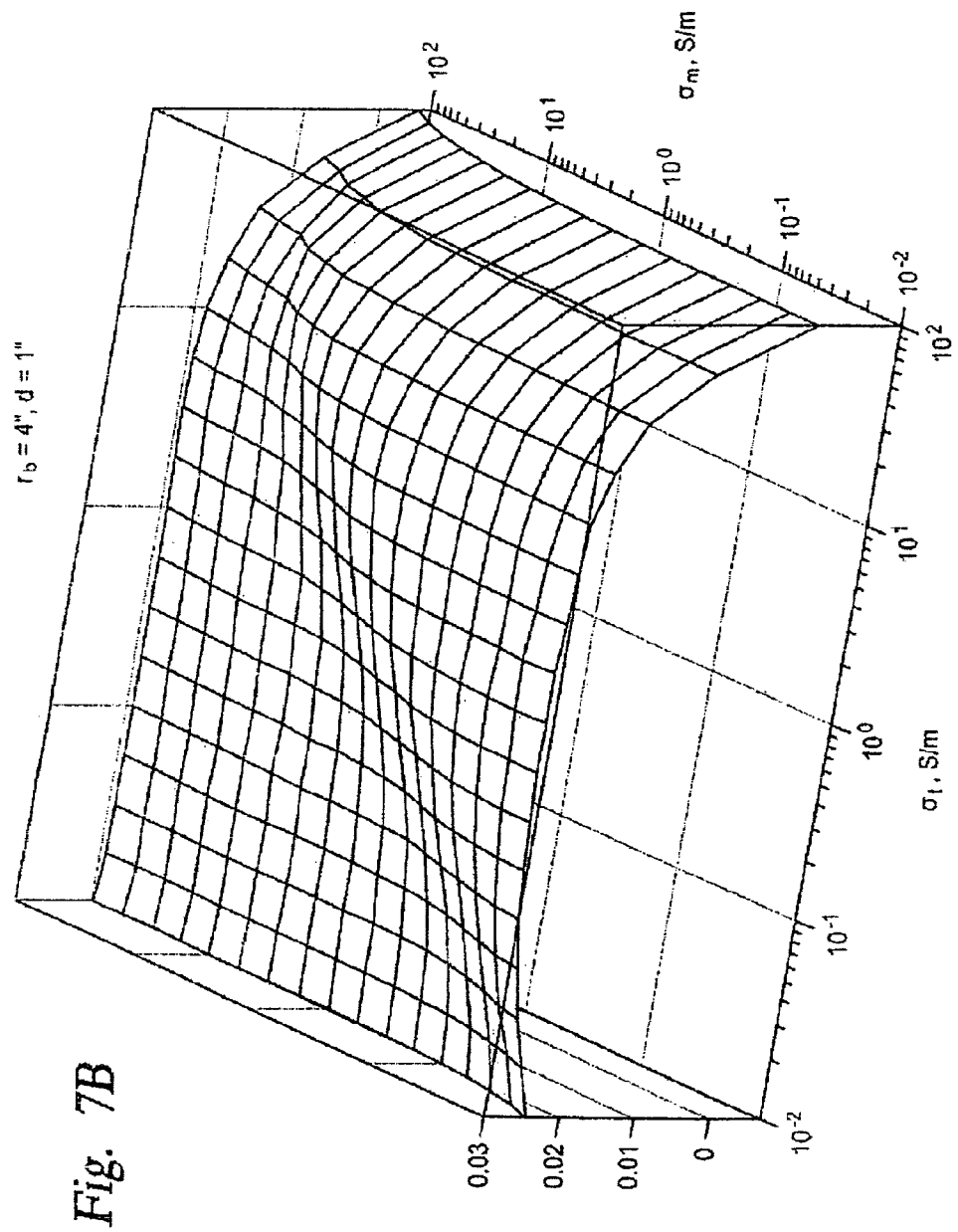
Figure 7C:
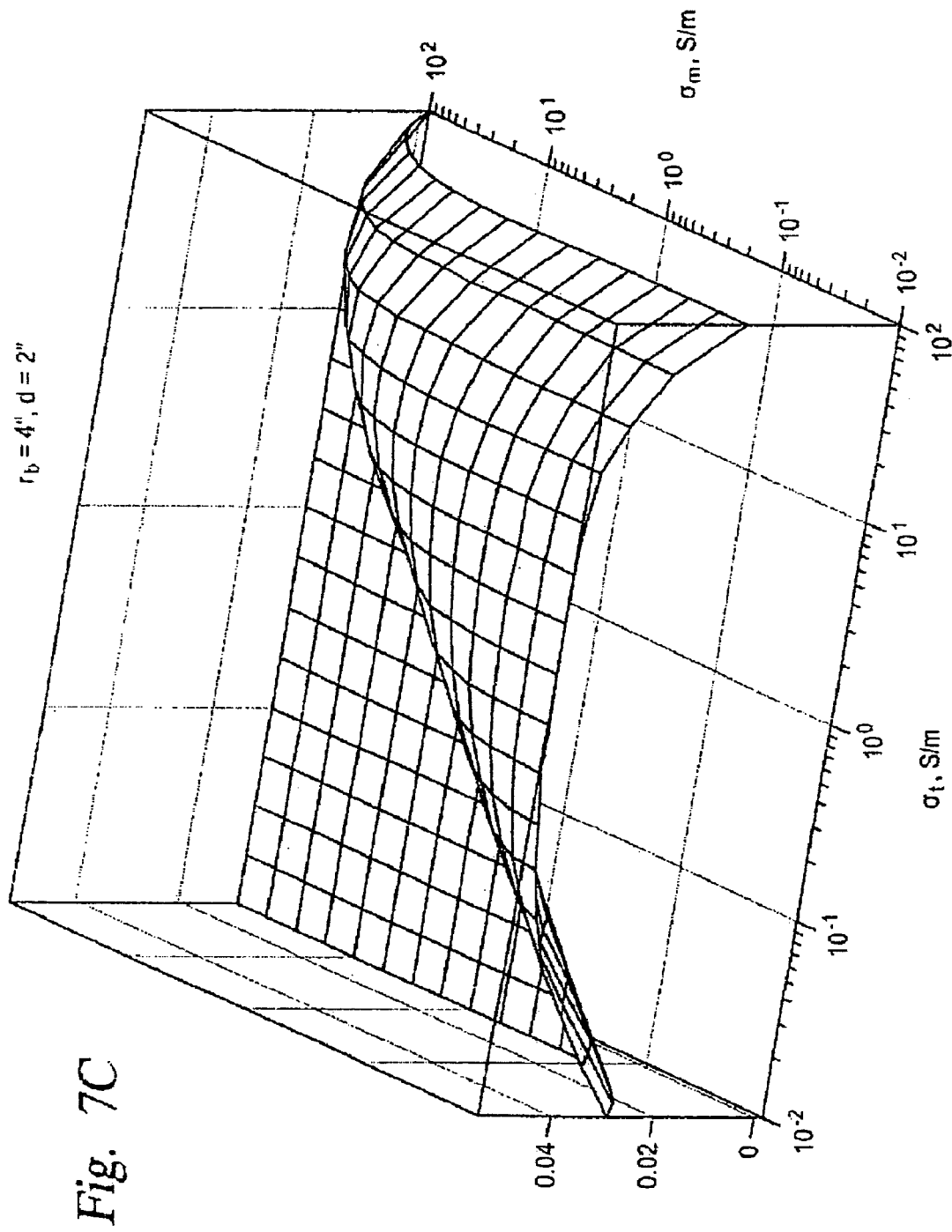
Figure 7D:
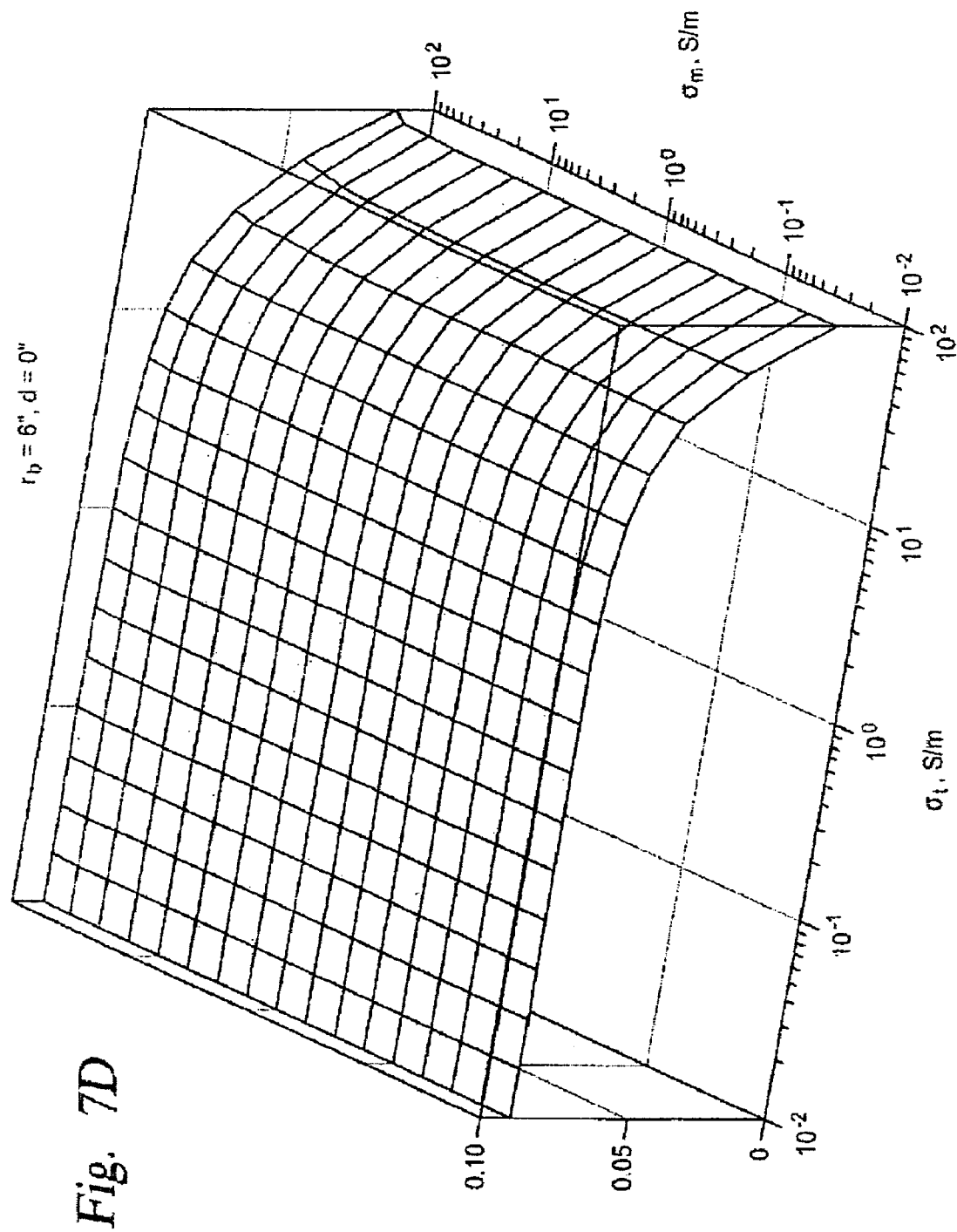
Figure 7E:
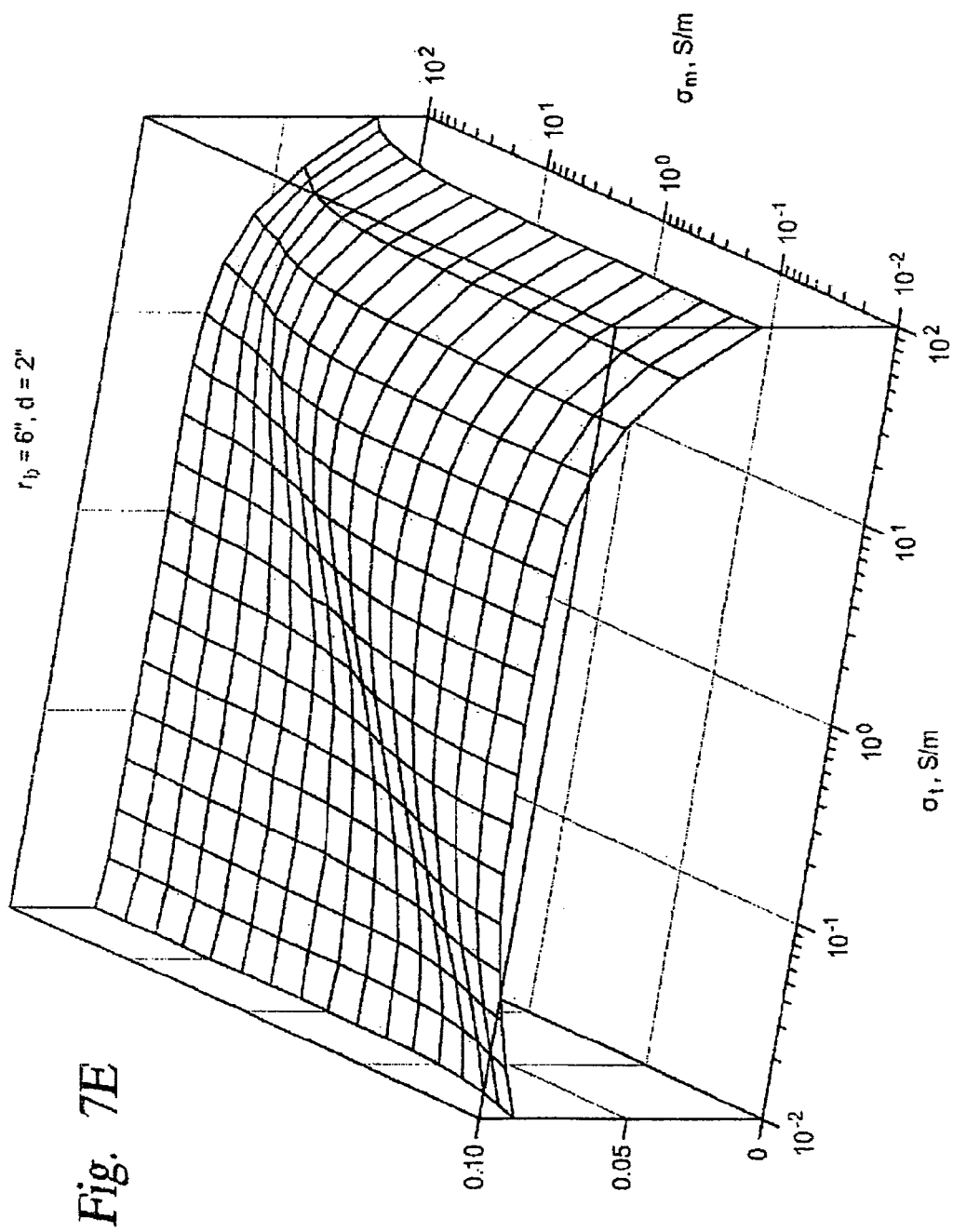
Figure 7F:
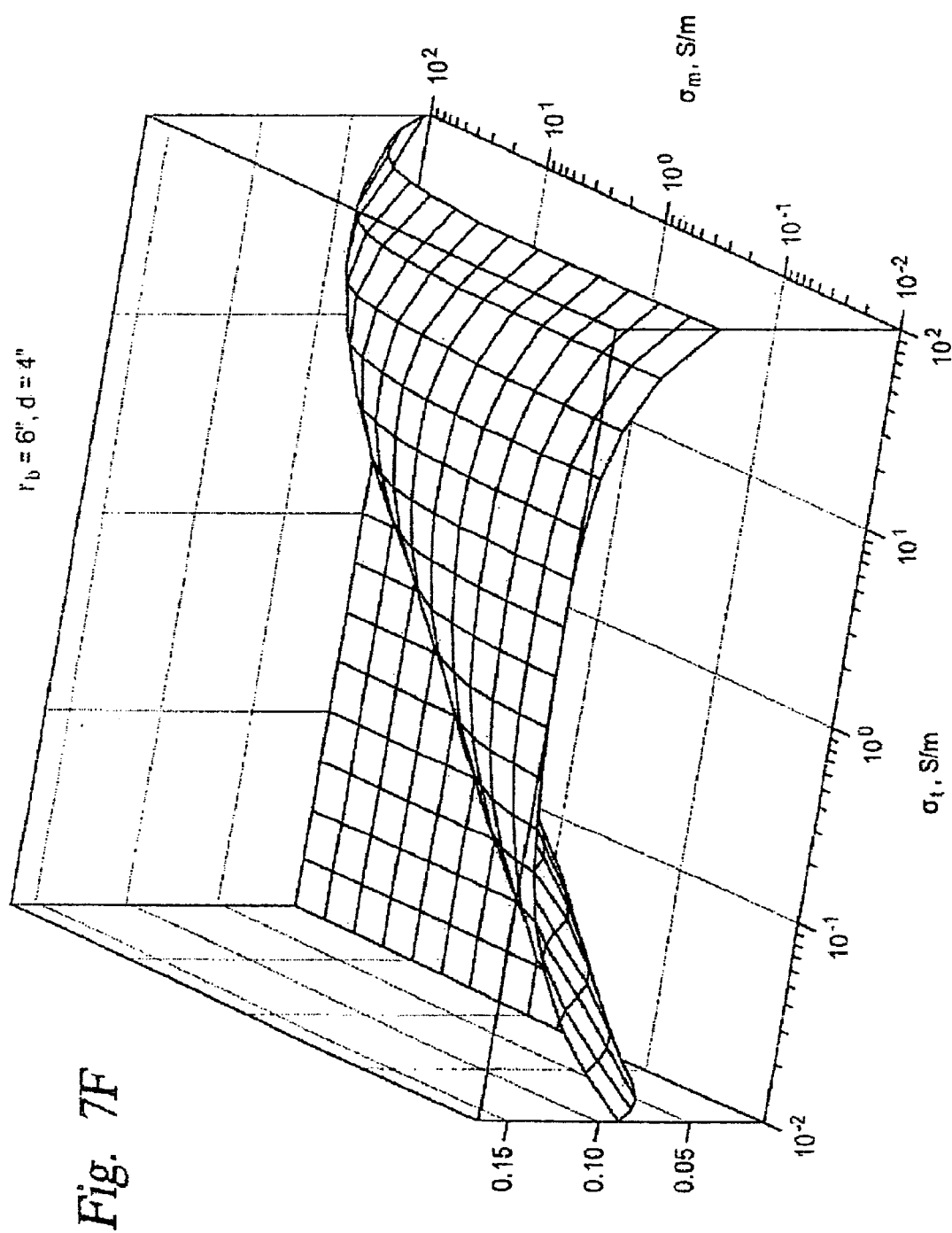

Having reviewed the basis of borehole correction and EFC, the relationship between $\sigma_a^{(hom)}$ and $\sigma_t$ will now be explained. The most closely spaced receiver on a multiple receiver instrument such as shown in FIG. 1 is least affected by the skin-effect correction, and the real component $\sigma_R^{(hom)}(\sigma_t) \approx \sigma_t$, to a first approximation. In general, the skin effect corrected value of the real and imaginary signal components can be determined by the expressions:

$$\sigma_R^{(hom)}(\sigma_t) = \sigma_t[1-\gamma(\sigma_t)], \quad (8)$$

$$\sigma_X^{(hom)}(\sigma_t) = \sigma_t \tilde{\gamma}(\sigma_t), \quad (9)$$

where, for small values of $\sigma_t$ the skin effect correction functions $\gamma(\sigma_t) \approx 0$ and $\tilde{\gamma}(\sigma_t) \approx 0$. Moreover, $\tilde{\gamma}(\sigma_t) \approx \gamma(\sigma_t)$ which reflects a well-known fact that the skin-effect-corrected $\sigma_t$ may be approximated by $\sigma_R + \sigma_X$. For an axially-symmetric transmitter and receiver array configuration, such as the longitudinally wound transmitter and receiver coils explained with reference to FIG. 1, the skin effect correction functions $\gamma(\sigma_t)$ and $\tilde{\gamma}(\sigma_t)$ can be calculated analytically. In practical implementations of the invention, it is enough to have them tabulated through the direct modeling. The behavior of the functions $\gamma(\sigma_t)$ and $\tilde{\gamma}(\sigma_t)$ is shown at curves 50 and 52, respectively, in FIG. 6.

Thus is obtained the expression:

$$\sigma_R(\sigma_m,\sigma_t) = \sigma_t[1-\gamma(\sigma_t)] + (\sigma_m - \sigma_t) g_R(r_b, d, \sigma_m, \sigma_t), \quad (10)$$

for the real signal component and:

$$\sigma_X(\sigma_m,\sigma_t) = \sigma_t \tilde{\gamma}(\sigma_t) + (\sigma_m - \sigma_t) g_X(r_b, d, \sigma_m, \sigma_t), \quad (11)$$

for the imaginary signal component.

Remember that $\sigma_R$ and $\sigma_X$ are known quantities because they are the real and imaginary parts of the apparent conductivity measured by the proximate receiver (R1 in FIG. 1). The functions $\gamma(\sigma_t)$ and $\tilde{\gamma}(\sigma_t)$ are also known by modeling or by deterministic calculation, for example. The pseudo-geometrical factors $g_R$ and $g_X$ can be calculated (and tabulated) by direct numerical modeling.

For a closely spaced receiver, the imaginary (X) signal component may be not very reliable to be used to calculate or estimate the EFC. The X signal component can be corrupted by such things as small relative motion of the induction coils (T, R1, R2, R3 in FIG. 1), by temperature variations, or by the magnetic permeability of the wellbore fluid or formation. Therefore, as a practical matter, methods according to the invention may use only the real component of the receiver signal to estimate EFC. Therefore, the principle of methods according to the invention is generating a solution to Eq. (10) with respect to $\sigma_t$, that is, to determine a unique value of EFC given the real component of the apparent conductivity signal measured by the proximate receiver, the wellbore radius, instrument center displacement and the wellbore (mud or air) conductivity. This does not exclude the possibility of using a weighted combination of the R and X signal components, in the cases when the X signal component can be reliably measured.

The function $g_R(r_b, d, \sigma_m, \sigma_t)$ can be tabulated, as explained above using numerical or other modeling, for a reasonable range of the borehole radius $r_b$ (usually in a range from just above the instrument radius $r_{tool}$ to some maximum expected wellbore radius value in which the instrument is ordinarily used). It is contemplated that the modeling will use significant but not excessive size increments, such as 0.5 inches. The instrument center displacement d may be modeled within a range from 0 to $r_b - r_{tool}$, meaning from centered to being in contact with the wellbore wall. A physically reasonable range and increment of $\sigma_m$ and $\sigma_t$ may be used (e.g., every 4 to 6 points per decade on a logarithmic scale). As shown in FIGS. 7A through 7F, the function $g_R(r_b, d, \sigma_m, \sigma_t)$ has a relatively simple behavior; it is approximately independent of $\sigma_m$ and $\sigma_t$ in many practical situations. FIGS. 7A through 7F graphically show the value of the pseudo geometric factor for various ranges of wellbore fluid conductivity, formation conductivity, wellbore radii and instrument center displacement (decentralization).

Once $r_b$ is known (e.g., from an independent caliper measurement or bit size), d may set using the standoff size, for example, and (an is determined (e.g., from a mud resistivity sensor on or proximate the instrument in the wellbore), a multidimensional interpolation can be used along with the previously constructed table of values of $g_R(r_b, d, \sigma_m, \sigma_t)$ as a function of $\sigma_t$ (for given $r_b$, d and $\sigma_m$). The foregoing provides enough information for solving Eq. (10) numerically, provided that (i) a solution for A, exists, (ii) it is unique, and (iii) the procedure for solving for at is stable.

One of the possible ways of solving Eq. (10) is to express $\sigma_t$ in the form:

$$\sigma_t = \frac{\sigma_R - \sigma_m g_R(r_b, d, \sigma_m, \sigma_t)}{1 - \gamma(\sigma_t) - g_R(r_b, d, \sigma_m, \sigma_t)}. \quad (12)$$

Strictly speaking, Eq. (12) is not a direct solution to Eq. (10), because the right-hand side of Eq. (12) also depends on $\sigma_t$ through $g_R(r_b, d, \sigma_m, \sigma_t)$ and $\gamma(\sigma_t)$. Nevertheless, it is possible to solve Eq. (12) through numerical iteration. Remember that $\sigma_R$ is the tool measurement, $\sigma_m$, $r_b$ and d are known or determinable from other sources (mud resistivity sensor, caliper, standoff), $g_R(r_b, d, \sigma_m, \sigma_t)$ can be extracted from the existing borehole correction tables, and $\gamma(\sigma_t)$ can be easily calculated (or modeled).

Equation (10) can be solved iteratively by the expression:

$$\sigma_t^{(J+1)} = \frac{\sigma_R - \sigma_m g_R(r_b, d, \sigma_m, \sigma_t^{(J)})}{1 - \gamma(\sigma_t^{(J)}) - g_R(r_b, d, \sigma_m, \sigma_t^{(J)})}, \quad (13)$$

where J is the index of the iteration step (the iteration step number). It has been determined that the initial value of EFC, $\sigma_t^{(0)}$ can be arbitrarily set to a small value, e.g., $\sigma_t^{(0)} = 0.0001$ S/m (Siemens/meter). Another possibility for setting the initial value of EFC could be to use $\sigma_t$ calculated from the preceding receiver measurement. To ensure that at any iteration step the calculated value will not fall outside of the tabulated range of values, $\sigma_t < \sigma_t^{(max)}$ (where $\sigma_t^{(max)}$ is the largest tabulated value of $\sigma_t$), the iteration procedure may include a "safety" condition:

$$\text{If } \sigma_t^{(J+1)} > \sigma_t^{(max)} \text{ then } \sigma_t^{(J+1)} = \sigma_t^{(max)}. \quad (14)$$

It should be noted that for iterations of the form $$\sigma_t^{(J+1)} = h(\sigma_t^{(J)}), \text{ for } J=0,1,2,\ldots \quad (15)$$

at any point $\xi$ where $h(\xi) = \xi$ (cf. Eq. (12)), a necessary condition for convergence is $|h'(\xi)| < 1$. Furthermore, a faster convergence may be achieved with the secant method, $$\sigma_t^{(J+1)} = \sigma_t^{(J)} - w(\sigma_t^{(J)}) \frac{\sigma_t^{(J)} - \sigma_t^{(J-1)}}{w(\sigma_t^{(J)}) - w(\sigma_t^{(J-1)})}, \quad (16)$$

where $w(\sigma_t) = h(\sigma_t) - \sigma_t$.

Testing has found that the iteration procedure of Eq. (13) is convergent for most situations in which an instrument as shown in FIG. 1 is to be used. In the examples shown below, in which the values of $g_R(r_b, d, \sigma_m, \sigma_t)$ were determined for the nearest receiver on the instrument explained with reference to FIG. 1, subsequent approximations $\sigma_t^{(J)}$ are given, beginning from $\sigma_t^{(I)}$

EXAMPLE 1

$r_b = 6"$, $d = 4"$, $\sigma_m = 10$ S/m, $\sigma_t = 1$ S/m ($\sigma_t^{(0)} = 0.0001$ S/m)

1.03149684078351
0.997944002022696
1.00015852808028
0.999989733849594
1.00000079194208
0.999999948716552
1.00000000395607
0.999999999743819
1.00000000001976
0.999999999998720

EXAMPLE 2

$r_b = 6"$, $d = 4"$, $\sigma_m = 1$ S/m, $\sigma_t = 10$ S/m ($\sigma_t^{(0)} = 0.0001$ S/m)

5.97999720303877
8.97302394798204
9.74079325537305
9.93462469755936
9.98351221333373
9.99584175090201
9.99895128183492
9.99973551129298
9.99993329544500
9.99998317698420

The foregoing example results show that to obtain 1% (0.1%) accuracy for the value of EFC, the iterative calculation method required just 2 (3) iterations in the first example and 4 (6) iterations in the second example.

The convergence of the above iteration procedure was analyzed for a wide range of values of wellbore radius $r_b$, instrument center displacement d, mud conductivity $\sigma_m$ and effective formation conductivity $\sigma_t$ ($r_{tool} < r_b \leq 10"$, 0.00001 S/m $\leq \sigma_t \leq$ 100 S/m, 0.002 S/m $\leq \sigma_m \leq$ 100 S/m) plus a separate value of $\sigma_m = 0.00001$ S/m, to approximate an air filled wellbore. The only cases where the iterative method explained above were found not to be convergent are listed below.

(i) large $\sigma_m$ values (approaching 100 S/m) in combination with large resistivity contrast between the wellbore and the surrounding formation, $\sigma_m/\sigma_t \geq 1000$, and small wellbore radius $r_b$ ($r_b < 3"$).

(ii) large $\sigma_t$ values, the boundary of effective convergence of the method depending on the borehole radius $r_b$ ($\sigma_t = 100$ S/m for $r_b = 4"$, but it reduces to $\sigma_t = 40$-50 S/m for $r_b = 10"$). It should be noted that both of the above situations are beyond what is considered to be the normal operational range of conventional electromagnetic induction well logging instruments.

Note that the examples considered above correspond to nodes (with respect to the variables $r_b$, d, and $\sigma_m$) of the borehole correction tables for $g_R(r_b, d, \sigma_m, \sigma_t)$, and the interpolation was performed with respect to $\sigma_t$ only. Practical implementations would also need to interpolate with respect to the other variables ($r_b$, d, and $\sigma_m$).

To summarize the proposed method by analyzing all the quantities occurring on the right-hand side of Eq. (13):

$$\sigma_t^{(J+1)} = \frac{\sigma_R - \sigma_m g_R(r_b, d, \sigma_m, \sigma_t^{(J)})}{1 - \gamma(\sigma_t^{(J)}) - g_R(r_b, d, \sigma_m, \sigma_t^{(J)})}.$$

where $\sigma_t$ is the effective formation conductivity (EFC), J is the iteration step, and $\sigma_t^{(J)}$ is the J-th approximation of $\sigma_t$. $\sigma_t^{(0)}$, as explained above, can be chosen in different ways. In the above examples, a fixed initial value of $\sigma_t^{(0)} = 0.0001$ S/m was chosen. $\sigma_R$ is the real part of the apparent conductivity determined from the near receiver (R1 in FIG. 1) measurements, $r_b$ is the borehole radius (known from the caliper measurement), d is the instrument center displacement from the center of the wellbore and can be considered known if the instrument is operated with standoffs, and $\sigma_m$ is the mud conductivity, such as can be measured by a mud resistivity sensor on the instrument or elsewhere. $\gamma(\sigma_t)$ is the skin-effect magnitude, which is also known (analytically or tabulated) and $g_R(r_b, d, \sigma_m, \sigma_t)$ is the pseudo-geometrical factor. As explained above, such pseudo-geometrical factor can be tabulated by modeling the receiver for all relevant ranges of the parameters needed to solve Eq. (13) above. The arguments $r_b$, d, and $\sigma_m$ do not change from one iteration step to the next, whereas the only changing parameter is $\sigma_t$ (during iterative determination of the $\sigma_t^{(J)}$ values).

In more complicated cases, when the iteration procedure may fail (or it is not stable), it may be useful to minimize the absolute value of the difference between the left-hand side and the right-hand side of Eq. (10). This may be performed together with similar minimization for Equation (11), perhaps using a lesser weight to the imaginary signal component $\sigma_X$-contribution. Other iterative techniques may be applied to determine the EFC, such as Brent's optimization method.

Once the value of $\sigma_t$ is determined, the values of apparent conductivity for all the receiver measurements (R1, R2 and R3 in the example instrument shown in FIG. 1) may be borehole corrected using a calculation similar to that of equation (1) and using the EFC calculated as explained above, with an appropriate depth adjustment.

Another aspect of the invention is a computer program stored in a computer readable medium. The program includes logic operable to cause a programmable computer to perform the method explained above with reference to Eq. (13) in particular. In a practical implementation, the computer would be disposed within the recording unit (16 in FIG. 1) and such computer program could be made to operate on measurements made by the well logging instrument (10 in FIG. 1) as it is moved along the wellbore.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for correcting induction conductivity well log measurements for conductivity of a wellbore and a formation proximate the wellbore, comprising: estimating an effective formation conductivity for the formation proximate the wellbore from measurements made by an induction receiver proximate an induction transmitter; wherein the estimating effective formation conductivity comprises selecting an initial value of the effective formation conductivity and iteratively calculating estimates of the effective formation conductivity using an output of each iterative calculation as input to successive iterative calculations thereof, using the effective formation conductivity to correct apparent conductivity measurements made by at least one induction receiver on the instrument wherein the iteration is performed according to the expression:

$$\sigma_t^{(J+1)} = \frac{\sigma_R - \sigma_m g_R(r_b, d, \sigma_m, \sigma_t^{(J)})}{1 - \gamma(\sigma_t^{(J)}) - g_R(r_b, d, \sigma_m, \sigma_t^{(J)})},$$

wherein
- $\sigma_t$ is the effective formation conductivity,
- J is an iteration step index,
- $\sigma_t^{(J)}$ is the J-th approximation of $\sigma_t$,
- $\sigma_t^{(0)}$ is the initial value of effective formation conductivity,
- $\sigma_R$ is the real part of the apparent conductivity determined from the proximate receiver measurements,
- $r_b$ is a wellbore radius,
- d is an amount of displacement of a well logging instrument from a center of the wellbore,
- $\sigma_m$ is conductivity of a fluid in the wellbore,
- $\gamma(\sigma_t)$ the skin-effect magnitude for the effective formation conductivity, and
- $g_R(r_b,d,\sigma_m,\sigma_t)$ is a pseudo-geometrical borehole correction factor.

2. The method of claim 1 further comprising interpolating values of the pseudo geometrical factor when determined values of the wellbore radius, displacement, fluid conductivity and effective formation conductivity are intermediate to values for which model calculations of the pseudo geometric factor have been generated.

3. The method of claim 1 wherein the initial value of effective formation conductivity is about 0.0001 Siemens/meter.

4. The method of claim 1 wherein the initial value of effective formation conductivity is a prior estimate of effective formation conductivity from a prior proximate receiver measurement.

5. A method for determining conductivity of formations penetrated by a wellbore, comprising:
moving an induction well logging instrument along the wellbore, the instrument including at least one transmitter and a plurality of receivers at spaced apart positions along the instrument from the transmitter;
passing electric current through the transmitter to induce electromagnetic fields in the formations;
detecting voltages in each of the plurality of receivers, wherein the voltages correspond to electrical conductivity of the media surrounding the well logging instrument;
estimating an effective formation conductivity for the formation proximate the wellbore from measurements made by the receiver most proximate the transmitter; and
using the effective formation conductivity to correct apparent conductivity measurements made by each of the receivers,
wherein the estimating effective formation conductivity comprises selecting an initial value of the effective formation conductivity and iteratively calculating estimates of the effective formation conductivity using an output of each calculation as input to successive iterative calculations thereof, wherein the iteration is performed according to the expression:

$$\sigma_t^{(J+1)} = \frac{\sigma_R - \sigma_m g_R(r_b, d, \sigma_m, \sigma_t^{(J)})}{1 - \gamma(\sigma_t^{(J)}) - g_R(r_b, d, \sigma_m, \sigma_t^{(J)})},$$

wherein
- $\sigma_t$ is the effective formation conductivity,
- J is an iteration step index,
- $\sigma_t^{(J)}$ is the J-th approximation of $\sigma_t$,
- $\sigma_t^{(0)}$ is the initial value of effective formation conductivity,
- $\sigma_R$ is the real part of the apparent conductivity determined from the proximate receiver measurements,
- $r_b$ is a wellbore radius,
- d is an amount of displacement of a well logging instrument from a center of the wellbore,
- $\sigma_m$ is conductivity of a fluid in the wellbore,
- $\gamma(\sigma_t)$ the skin-effect magnitude for the effective formation conductivity, and
- $g_R(r_b,d,\sigma_m,\sigma_t)$ is a pseudo-geometrical borehole correction factor.

6. The method of claim 5 wherein the initial value of effective formation conductivity is about 0.0001 Siemens/meter.

7. The method of claim 5 wherein the initial value of effective formation conductivity is a prior estimate of effective formation conductivity from a prior proximate receiver measurement.

8. The method of claim 5 further comprising interpolating values of the pseudo geometrical factor when determined values of the wellbore radius, displacement, fluid conductivity and effective formation conductivity are intermediate to values for which model calculations of the pseudo geometric factor have been generated.

9. A computer program stored in a computer readable medium, the program comprising logic operable to cause a programmable computer to perform:
estimating an effective formation conductivity for an Earth formation proximate a wellbore drilled therethrough from measurements made by an induction receiver proximate an induction transmitter on an induction logging instrument disposed within the wellbore; and
using the effective formation conductivity to correct apparent conductivity measurements made by at least one induction receiver on the instrument, wherein the estimating effective formation conductivity comprises selecting an initial value of the effective formation conductivity and iteratively calculating estimates of the effective formation conductivity using an output of each calculation as input to successive iterative calculations thereof, wherein the iteration is performed according to the expression:

$$\sigma_t^{(J+1)} = \frac{\sigma_R - \sigma_m g_R(r_b, d, \sigma_m, \sigma_t^{(J)})}{1 - \gamma(\sigma_t^{(J)}) - g_R(r_b, d, \sigma_m, \sigma_t^{(J)})},$$

wherein
- $\sigma_t$ is the effective formation conductivity,
- J is an iteration step index,
- $\sigma_t^{(J)}$ is the J-th approximation of $\sigma_t$,
- $\sigma_t^{(0)}$ is the initial value of effective formation conductivity,
- $\sigma_R$ is the real part of the apparent conductivity determined from the proximate receiver measurements, $r_b$ is a wellbore radius, d is an amount of displacement of a well logging instrument from a center of the wellbore, $\sigma_m$ is conductivity of a fluid in the wellbore, $\gamma(\sigma_t)$ the skin-effect magnitude for the effective formation conductivity, and $g_R(r_b,d,\sigma_m,\sigma_t)$ is a pseudo-geometrical borehole correction factor.

10. The computer program of claim 9 further comprising logic operable to cause the computer to perform interpolating values of the pseudo geometrical factor when determined values of the wellbore radius, displacement, fluid conductivity and effective formation conductivity are intermediate to values for which model calculations of the pseudo geometric factor have been generated.

11. The computer program of claim 9 wherein the initial value of effective formation conductivity is about 0.0001 Siemens/meter.

12. The computer program of claim 9 wherein the initial value of effective formation conductivity is a prior estimate of effective formation conductivity from a prior proximate receiver measurement.

* * * * *